(12) United States Patent
Yamada et al.

(10) Patent No.: US 7,135,232 B2
(45) Date of Patent: Nov. 14, 2006

(54) THERMAL CONDUCTIVE COMPOSITION, A HEAT DISSIPATING PUTTY SHEET AND HEAT DISSIPATING STRUCTURE USING THE SAME

(75) Inventors: Shunsuke Yamada, Nishikamo-gun (JP); Masakazu Hattori, Nishikamo-gun (JP); Hajime Funahashi, Nishikamo-gun (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 0 days.

(21) Appl. No.: 10/874,124

(22) Filed: Jun. 22, 2004

(65) Prior Publication Data

US 2005/0004305 A1    Jan. 6, 2005

(30) Foreign Application Priority Data

Jul. 4, 2003    (JP) .............................. 2003-271120

(51) Int. Cl.
*B32B 9/01* (2006.01)

(52) U.S. Cl. ...................... 428/447; 428/156; 524/404; 524/424; 524/428; 524/588; 528/31; 528/32

(58) Field of Classification Search ..................... None
See application file for complete search history.

(56) References Cited

U.S. PATENT DOCUMENTS

2003/0113556 A1 * 6/2003 Feng et al. ................. 428/447

2004/0254275 A1 * 12/2004 Fukui et al. ................ 524/261

FOREIGN PATENT DOCUMENTS

| EP | 114000 A1 | * | 1/1983 |
| EP | 939115 A1 | * | 9/1999 |
| JP | 7-183434 | | 7/1995 |
| JP | 2004-331835 A | * | 11/2004 |
| WO | WO02/092693 | * | 11/2002 |

* cited by examiner

*Primary Examiner*—Marc S. Zimmer
(74) *Attorney, Agent, or Firm*—Hamre, Schumann, Mueller & Larson, P.C.

(57) ABSTRACT

The present invention provides a thermal conductive composition formed by blending a thermal conductive filler of not less than 600 mass parts to 100 mass parts of a liquid silicone having a viscosity in a range of 20 to 2000 mPa·s. Since the thermal conductive composition is not crosslinked further or cured at a normal temperature of 25° C., it keeps a putty state, and the thermal conductivity is not less than 3 W/m·K. A heat-dissipating putty sheet according to the present invention is formed by applying the thus obtained thermal conductive composition onto a release sheet. The heat-dissipating putty sheet having a thickness ranging from 0.5 mm to 3 mm can be released manually from a release base, or it can be transferred from a release sheet to a heat-generating part or a dissipator so as to be attached to a desired position easily.

10 Claims, 3 Drawing Sheets

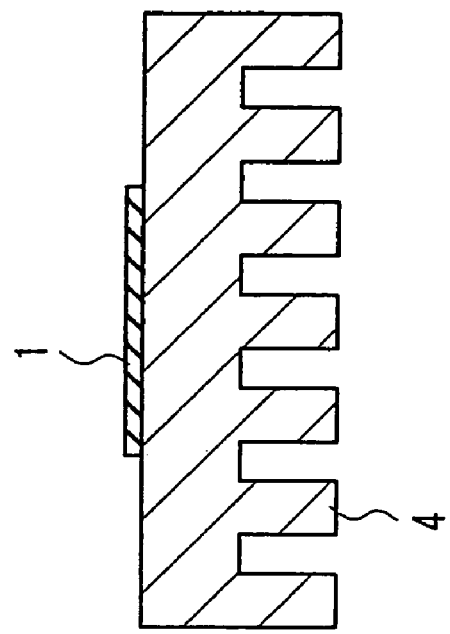
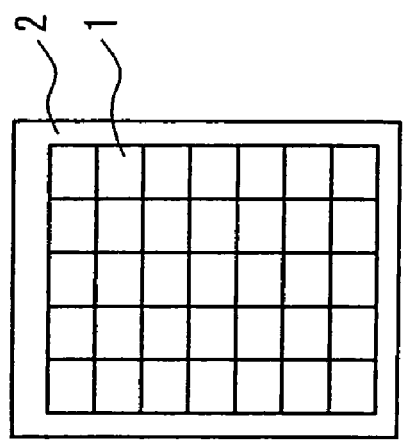
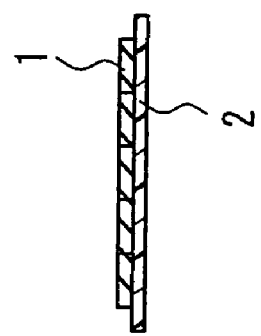
FIG. 1C
FIG. 1B
FIG. 1A

THERMAL CONDUCTIVE COMPOSITION, A HEAT DISSIPATING PUTTY SHEET AND HEAT DISSIPATING STRUCTURE USING THE SAME

FIELD OF THE INVENTION

The present invention relates to a thermal conductive composition used in a structure for heat-dissipation and cooling of a heat-generating part, a heat-dissipating putty sheet and a heat-dissipating structure using the same.

BACKGROUND OF THE INVENTION

Recently, removing heat from heat-generators has been considered as an important object in various fields. Particularly for various electronic equipment and electronic devices such as personal computers, removing heat from heat-generating electronic parts (hereinafter, referred to as "heat-generating part") has been an important object. As a temperature rises at the heat-generating part, malfunctions may occur, and this will result in a major cause of failures in the equipment. Conventionally, for a thermal conductive member used in a part of a heat-dissipating and cooling structure for a heat-generating member or the like mounted on a substrate, a thermal conductive dissipating sheet or the like has been proposed, and used in various fields for the purpose of removing heat from heat-generating parts in various electronic equipment and various electronic devices such as personal computers (see JP H07-183434A).

However, since heat generation at such a heat-generating part has increased more and more recently, thermal conductive members and heat-dissipating sheets are required to have a high thermal conductivity Since a heat-dissipating sheet of a rubber sheet (e.g., Thercon TR manufactured by Fuji Polymer Industries Co., Ltd.) has a limited performance in improving the thermal conductivity, use of heat-dissipating gel sheets has been increased due to its softness and good adhesiveness. Even such a heat-dissipating gel sheet cannot sufficiently account for the increasing heat output at heat-generating parts, and sometimes, the sheet cannot meet the requirement.

In light of these circumstances, recently, a thermal conductive grease or the like has been often used, since the grease can be applied and spread to form an extremely thin film, and it provides excellent adhesiveness between a heat-generating part and a heat-dissipating member, while the operability is sacrificed.

SUMMARY OF THE INVENTION

Therefore, with the foregoing in mind, it is an object of the present invention to provide a thermal conductive composition that can be released manually from a release base or that can be transferred from a release sheet to a heat-generating part or a heat-dissipating member, and thus can be attached easily to a desired position. The present invention provides also a heat-dissipating putty sheet and a heat-dissipating structure containing the thermal conductive composition.

A thermal conductive composition according to the present invention is formed by blending a thermal conductive filler of not less than 600 mass parts to 100 mass parts of a liquid silicone having a viscosity ranging from 20 to 2000 mPa·s. The composition is not crosslinked further or cured, and thus keeps its putty state at a normal temperature of 25° C., and the thermal conductivity is 3 W/m·K or more.

A heat-dissipating putty sheet according to the present invention is formed by shaping a thermal conductive composition having a thermal conductivity of 3 W/m·K or more on a release sheet. Here, the thermal conductive composition is prepared by blending a thermal conductive filler of not less than 600 mass parts with respect to 100 mass parts of a liquid silicone having a viscosity ranging from 20 to 2000 mPa·s. The thermal conductive composition is not crosslinked further or cured, and thus keeps its putty state at a normal temperature of 25° C. The heat-dissipating putty sheet has a thickness ranging from 0.5 mm to 3 mm.

A heat-dissipating structure according to the present invention is formed by interposing a heat-dissipating putty sheet between a heat-generating element and a heat-dissipating member. The heat-dissipating putty sheet, having a thermal conductivity of 3 W/m·K or more and a thickness of 0.5 mm to 3 mm, is prepared by blending a thermal conductive filler of not less than 600 mass parts with respect to 100 mass parts of a liquid silicone having a viscosity ranging from 20 to 2000 mPa·s, and it is not crosslinked further or cured, and thus keeps its putty state at a normal temperature of 25° C.

BRIEF DESCRIPTION OF THE DRAWINGS

FIG. 1A is a cross-sectional view showing a putty sheet according to Example 1 of the present invention. FIG. 1B is a plan view of the putty sheet, and FIG. 1C is a cross-sectional view of the putty sheet bonded to a heat-dissipating member.

DETAILED DESCRIPTION OF THE INVENTION

Figure 2C:
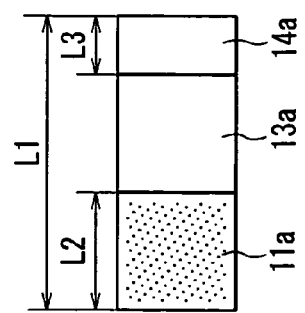
FIG. 2C is a plan view showing one unit of the putty sheet peeled with a film having a tab.

A thermal conductive composition of the present invention, and a heat-dissipating putty sheet and a heat-dissipating structure using the same, are not crosslinked further or cured at a normal temperature, thereby keeping the putty state, and the thermal conductivity is 3 W/m·K or more. Due to the easiness in attachment and repairability, the heat-dissipating putty sheet can be detached manually from a release base or it can be transferred and stuck easily from a release sheet to a dissipator or the like.

In this specification, the term 'putty' indicates that crosslinking of a composition does not proceed and thus the composition is not cured even after 2000 hours at a normal temperature, or that crosslinking does not proceed to cause curing or vulcanization does not proceed even under a condition of heat of 25° C. to 180° C. and pressure of $2\times10^4$ to $7\times10^5$ Pa.

For example, a commercially-available liquid silicone gel material used for the polymer consists of a solution A and solution B. The solution A contains a vinyl group-containing dimethyl polysiloxane and a catalyst, while the solution B contains a crosslinking agent and a vinyl group-containing dimethyl polysiloxane. The catalyst can include platinum, for example. When the solutions A and B are mixed at a ratio of 1:1 (50:50) and heated, the liquid mixture turns to a gel. The liquid mixture will not be gelled or cured when the mixing ratio (A:B) is changed, for example, to a range of 95:5 to 55:45. A most preferred ratio is 60:40 (A:B). In this manner, an amount of a crosslinking agent used for crosslinking the polymer can be decreased. In other words, the amount of the crosslinking agent is suppressed to the lowest level so as to provide an incompletely cured or semi-cured state, thereby keeping the putty in an unvulcanized/uncured state.

Furthermore, with respect to 100 mass parts the liquid silicone, a thermal conductive filler of 600 mass parts or more is blended for increasing the thermal conductivity. Specifically, the thermal conductivity is increased to 3 W/m·K or more.

Alternatively, a clay-like putty composition can be produced by using a straight silicone oil. A straight oil, being free of a crosslinking agent, can be formed to a putty.

As mentioned above, the liquid silicone material used for a silicone putty of the present invention is an additive type liquid silicone gel or a straight silicone oil.

The thermal conductive composition of the present invention is prepared by blending a thermal conductive filler in a liquid silicone having a viscosity of 20 to 2000 mPa·s, and then shaped as a sheet on a release sheet, by using a presser or the like. The thermal conductivity is 3 W/m·K or more. The heat-dissipating putty sheet can be released manually from a release base, or it can be transferred from a release sheet to a heat-generating part or a dissipater easily in order to be bonded to a desired position in a simple manner.

In the present invention, "unvulcanized" denotes an incompletely cured state. Namely, the term includes an uncured, a partially cured or semi-cured state. Crosslinking can be interrupted to keep an unvulcanized or semivulcanized state. It is preferable that the crosslinking is adjusted by decreasing the crosslinking agent. Before a curing, the silicone gel is separated into a solution A and a solution B. The solution A contains a vinyl group-containing dimethyl polysiloxane and a platinum catalyst, and the solution B contains a crosslinking agent and a vinyl group-containing dimethyl polysiloxane. Therefore, the amount of the crosslinking agent can be adjusted by changing the ratio of the solution A to the solution B. Typically, the ratio of A:B=50:50. In the present invention, for further softening the silicone gel, it is preferable that the ratio (A:B) ranges from 95:5 to 55:45, most preferably, 60:40.

The heat-dissipating putty sheet on the release sheet is required to have a certain thickness so that the sheet can be handled manually. Preferably, the thickness is 0.5 mm to 3 mm.

A thicker heat-dissipating putty sheet may require a considerable compression force to interpose the heat-dissipating putty sheet between a heat-generating part and a dissipating fin so as to compress to a desired thickness. For handling the heat-dissipating putty sheet manually, a tab that can be picked up by hand may be provided onto the surface of the release sheet, thereby bonding by transferring on a subject at a desired position in a simple and easy manner.

A silicone gel used here is a silicone oil containing a functional group, which typically has vinyl groups introduced at the end groups. Methyl groups are used as typical substituents of silicon atoms other than the vinyl groups. Phenyl groups, trifluoropropyl groups or the like can be used as well. The viscosity is preferably 20 to 2000 mPa·s.

Hydrogen polysiloxane as a crosslinking agent is a low-molecular weight polymer having SiH bonds in the molecules. In general each molecule of the hydrogen polysiloxane in use has at least three SiH groups. A platinum compound is most suitable for a curing catalyst, and preferably, a platinum complex being soluble in a silicone oil is used for a catalyst. The examples include a methylvinyl polysiloxane complex and an alcohol-denatured complex of platinum. For a reaction inhibitor, acetylene alcohols, methylvinyl cyclotetrasiloxane, siloxane-modified acetylene alcohols, hydroperoxide or the like can be used.

An example of the liquid silicone is a silicone oil. A silicone oil includes a straight silicone oil of dimethyl silicone oil (Formula 1) and/or methylphenyl silicone oil (Formula 2). Though the viscosity can be decreased depending on the polymerization degree, a preferable viscosity range is from 20 to 2000 mPa·s.

Formulae (1) and (2) of straight silicone oils are described below.

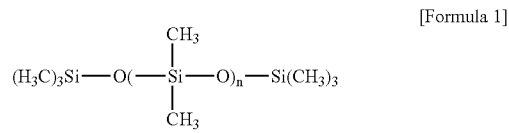
[Formula 1]

(Here, n denotes a polymerization degree in a range of 50 to 50000.)

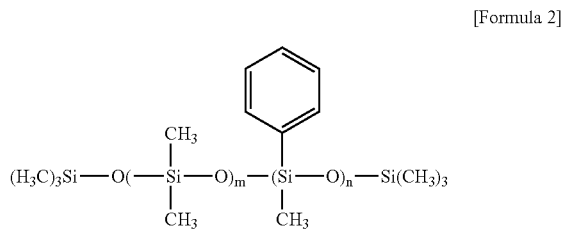
[Formula 2]

(Here, m and n denote polymerization degrees, and the value of m+n is in a range of 50 to 50000.)

The Formula 2 represents a random copolymer. For the mole ratio, m ranges from 0.5 to 0.9, and n ranges from 0.1 to 0.5. In a methylphenyl silicone oil having a viscosity of 100 mPa·s, m=0.9 and n=0.1 in a mole ratio. When the viscosity is 1000 mPa·s, m=0.5 and n=0.5 in a mole ratio.

In this embodiment, it is preferable that a thermal conductive filler of not less than 600 mass parts is added to 100 mass parts of a liquid silicone consisting of the solutions A and B. The thermal conductive filler used here is prepared by mixing suitably one or two kinds from metal oxides, metal nitrides, and metal carbides. The thermal conductive filler can be subjected to a surface treatment with a silane coupling agent or the like, by using a known technique. For reducing the viscosity of the thermal conductive composition prepared by adding a thermal conductive filler to a liquid silicone, a reactive diluent can be added. For the reactive diluent, a liquid silicone having a polymerization degree lower than 50 can be used preferably.

A flame retardant can be added to provide flame resistance to the liquid silicone. The flame retardant used here is prepared by mixing suitably one or two kinds from metal hydroxides, metal oxides, platinum chloride, alcohol-denatured platinum chloride, platinum olefin complex or the like. A preferable blend content ranges from 0.1 to 10 mass parts with respect to 100 mass parts of the liquid silicone.

An antioxidant can be added to the liquid silicone. The antioxidant can be selected from metal oxides and metal hydroxides. Specific examples thereof include cerium oxide, cerium hydroxide, iron oxide or the like, which can be used alone or combined suitably with any one of the remaining examples. The antioxidant is preferably blended in a range of 0.1 to 30 mass parts with respect to 100 mass parts of the liquid silicone.

For increasing the viscosity, a thickener or a gelling agent can be added. The thickener or the gelling agent can be selected from inorganic compounds such as silica or organic compounds such as a polyfluoroethylene powder and amino acid derivatives. The thickener or the gelling agent can be selected alone from commercially-available products or can be combined with any one of the remaining examples of the commercially-available thickeners or gelling agents.

The heat-dissipating putty sheet can be shaped by pressing, coating, calendaring or the like. The shaping method can be selected arbitrarily depending on the characteristics of the thermal conductive composition.

The release sheet can comprise a synthetic resin sheet, and the material of the release sheet can be selected arbitrarily from polyethylene, polypropylene, fluorine resin, polyester, polyimide or the like. The sheet has a thickness ranging from 12 to 100 μm, more preferably, from 25 to 50 μm.

It is preferable that the release sheet is treated to have an embossed surface. The pattern of the embossed surface can be selected suitably from a diamond pattern, a tortoise-shell pattern, a satin-finished pattern or the like.

The release sheet can be prepared by coating a releasing agent on a base film and treating the surface of the sheet to have an embossed pattern. The difference in evaluation of the embossed area is preferably from 5 to 150 μm. It is preferable that the release sheet has a tab, and more preferably, the tab has a length of 8 mm or more. The length of the tab can be increased by attaching a tab tape or the like. Furthermore, a mark for indicating the tab position can be provided.

The putty sheet of the present invention is formed on a release sheet, and it can be transferred from the release sheet to a subject.

The putty sheet can be released manually from the release sheet, without any considerable deformation.

It is preferable that the putty sheet has a thermal resistance of not more than 0.6° C./Watt.

It is preferable that a compression force when compressing the putty sheet by 50% in the thickness direction is not more than 10 kgf/cm$^2$.

The heat-dissipating putty sheet according to the present invention, which is prepared by blending a thermal conductive filler in a liquid silicone, has a thermal conductivity of not less than 3 W/m·K. The heat-dissipating putty sheet can be released manually from a release base, or it can be transferred easily from a release sheet to a dissipator or the like for bonding.

EXAMPLES

Specific embodiments of the present invention will be described below by referring to the following examples.

The thermal conductive filler used in the respective Examples was aluminum oxide particles (average particle diameter: 3 μm) subjected to a surface treatment with 1 mass % of hexamethyldisilazane (trade name: TSL8802, manufactured by GE TOSHIBA SILICONE). Characteristics in the respective Examples were measured in the following manner.

(1) Thermal conductivity was measured corresponding to JIS R2616 (ISO 8894-1), by using QIM-D3 manufactured by Kyoto Electronics Manufacturing Co., Ltd.
(2) Dielectric constant was measured corresponding to JIS K6911.
(3) For measuring a loading value at a 50% compression, a compression meter (310N-type apparatus manufactured by AIKOH ENGINEERING CO., LTD.) was used. A sample of 10 mm×10 mm (1 cm$^2$) was compressed by 50% in the thickness direction, by using aluminum sheets of 27 mm×27 mm and 4 mm in thickness, at a compression rate of 5 mm/min. so as to measure the loading value kgf/cm$^2$).

Example 1

100 mass parts of silicone gel (trade name: SH1886, manufactured by Dow Corning Thray Silicone Co., Ltd.) was prepared. This silicone gel consisted of a solution A and a solution B blended in a ratio (A:B) of 80:20 by mass parts. To this silicone gel 800 mass parts of aluminum oxide particles as a thermal conductive filler (AS30 manufactured by SHOWADENKO) and 4 mass parts of black iron oxide were added, and the silicone gel was kneaded to provide a thermal conductive composition. This composition was sandwiched between release sheets having fluorine resin layers, and pressed at a temperature of 100° C. for 30 minutes, thereby forming a heat-dissipating sheet having a thickness of 1.5 mm. After peeling one of the release sheets, the thus obtained heat-dissipating sheet was cut into half in the thickness direction (hereinafter, referred to as "half-cut") with a cutter so as to provide a sample.

FIG. 1A is a cross-sectional view of a heat-dissipating sheet in Example 1, and FIG. 1B is a plan view of the heat-dissipating sheet. Each piece of the heat-dissipating sheet 1 shown in FIG. 1A or 1B is separated manually along each incision. The piece is bonded to a backside of a dissipator 4 as shown in FIG. 1C. The backside of the dissipator 4 provided with a heat-dissipating putty sheet is pressed on a heat-generating electronic part such as a semiconductor so as to bond. In FIGS. 1A and 1B, 2 denotes a release sheet. This heat-dissipating putty sheet, having a good repairability, kept its putty state for a long time. The evaluation result will be shown in tables below.

Example 2

100 mass parts of silicone gel (SH1886, A:B=60:40 by mass part) was prepared. To this silicone gel, 850 mass parts of aluminum oxide particles as a thermal conductive filler (AS30 manufactured by SHOWADENKO) having an average particle diameter of 17 μm and 250 mass parts of manganese zinc ferrite (manufactured by TODAKOGYO CORP.) having a particle diameter of 5 μm were added, and the silicone gel was kneaded to provide a thermal conductive composition. This composition was sandwiched between release sheets having fluorine resin layers and pressed at a temperature of 100° C. for 30 minutes, thereby forming a sheet having a thickness of 1.5 mm. After peeling one of the release sheets, the thus obtained heat-dissipating sheet was half-cut with a cutter so as to provide a sample. This heat-dissipating putty sheet, having a good repairability, kept its putty state for a long time. The evaluation result will be shown in tables below.

Comparative Example 1

100 mass parts of silicone gel (SH1886, A:B=50:50 by mass parts) was prepared. To this silicone gel 800 mass parts of aluminum oxide particles as a thermal conductive filer (AS30 manufactured by SHOWADENKO) and 4 mass parts of black iron oxide were added, and the silicone gel was kneaded to provide a thermal conductive composition. This composition was sandwiched between release sheets having fluorine resin layers, pressed at a temperature of 100° C. for 30 minutes and cured, thereby forming a sheet having a thickness of 1.5 mm. After peeling one of the release sheets, the thus obtained heat-dissipating sheet was half-cut with a cutter so as to provide a sample. The evaluation result will be shown in tables below. The thermal conductive composition of Comparative Example 1 was cured to form a gel after being stored for 20 hours at a room temperature (25° C.). Since a large compression load should be imposed to crush this gelled composition, the inherent performance of heat conduction will be hindered. Furthermore, when such a composition in an uncured state is assembled into a heat-generating electronic part, it will be cured further to function just like an adhesive, hindering disassembling of the heat-dissipating member and the heat-generating member.

Comparative Example 2

100 mass parts of silicone gel (SH1886, A:B=50:50 by mass parts) was prepared. To this silicone gel 850 mass parts of aluminum oxide particles as a thermal conductive filler (AS30 manufactured by SHOWADENKO) and 250 mass is parts of manganese zinc ferrite (manufactured by TODA-KOGYO CORP.) having a particle diameter of 5 μm were added, and the silicone gel was kneaded to provide a thermal conductive composition. This composition was sandwiched between release sheets having fluorine resin layers, pressed at a temperature of 100° C. for 30 minutes and cured, thereby forming a sheet having a thickness of 1.5 mm. After peeling one of the release sheets, the thus obtained heat-dissipating sheet was half-cut with a cutter so as to provide a sample. The evaluation result will be shown in tables below. The thermal conductive composition of Comparative Example 2 was cured to form a gel after being stored for 20 hours at a room temperature (25° C.). Since a large compression load should be imposed to crush this gelled composition, the inherent performance of heat conduction will be hindered. Furthermore, when such a composition in an uncured state is assembled into a heat-generating electronic part, it will be cured further to function just like an adhesive, hindering disassembling of the heat-dissipating member and the heat-generating member.

Example 3

100 mass parts of silicone gel (SH1886, A:B=80:20 by mass parts) was prepared. To this silicone gel 800 mass parts of aluminum oxide particles as a thermal conductive filler (AS30 manufactured by SHOWADENKO) and 4 mass parts of black iron oxide were added, and the silicone gel was kneaded to provide a thermal conductive composition. This composition was sandwiched between release sheets having fluorine resin layers and pressed at a temperature of 100° C. for 30 minutes, thereby forming a sheet having a thickness of 0.5 mm. The thus obtained heat-dissipating sheet was bonded to a polyethylene sheet having a thickness of 30 μm, provided with a tab of 10 mm in width, and cut apart with a cutter so as to provide a sample. This heat-dissipating putty sheet, having a good repairability, kept its putty state for a long time. The evaluation result will be shown in tables below.

Example 4

100 mass parts of silicone gel (SH1886, A:B=60:40 by mass parts) was prepared Tb this silicone gel 850 mass parts of aluminum oxide particles as a thermal conductive filler (AS30 manufactured by SHOWADENKO) and 250 mass parts of manganese zinc ferrite (manufactured by TODA-KOGYO CORP.) having a particle diameter of 5 μm were added, and the silicone gel was kneaded to provide a thermal conductive composition. This composition was sandwiched between release sheets having fluorine resin layers and pressed at a temperature of 100° C. for 30 minutes, thereby forming a sheet having a thickness of 0.5 mm. The thus obtained heat-dissipating sheet was bonded to a polyethylene sheet having a thickness of 30 μm, provided with a tab of 10 mm in width, and cut apart with a cutter so as to provide a sample. This heat-dissipating putty sheet, having a good repairability, kept its putty state for a long time. The evaluation result will be shown in tables below.

Each of the following examples refers to a thin heat-dissipating putty sheet. The thin heat-dissipating putty sheet will be transferred since it cannot be picked up directly by hand.

Figure 2B:
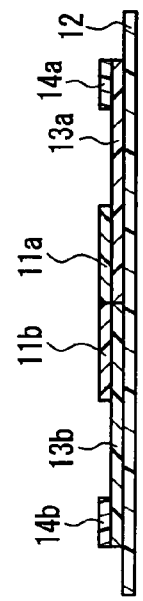
FIG. 2B is a cross-sectional view taken along a line I—I of FIG. 2A.
Figure 2A:
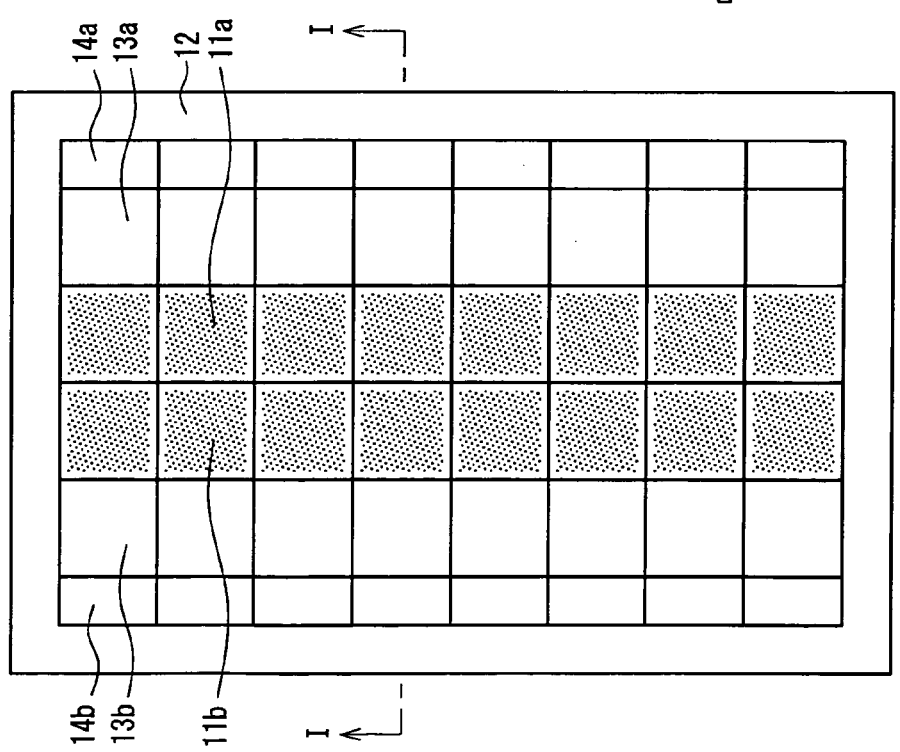
FIG. 2A is a plan view showing a putty sheet according to Example 4 of the present invention.

FIG. 2A is a plan view of a putty sheet according to Example 4, and FIG. 2B is a cross-sectional view taken along a line I—I of FIG. 2A. On a release film 12, polyethylene films 13a, 13b respectively having tabs and putty sheets 11a, 11b are laminated in this order. Tapes 14a and 14b for indicating pickup positions are bonded to the ends of the polyethylene films 13a, 13b having tabs. FIG. 2C shows dimensions of one unit. The polyethylene film 13a having a tab has a width L1 of 55 mm, and the putty sheet 11a has a width L2 of 25 mm. The tape 14a for indicating the pickup position has a width L3 of 10 mm.

Figure 3A:
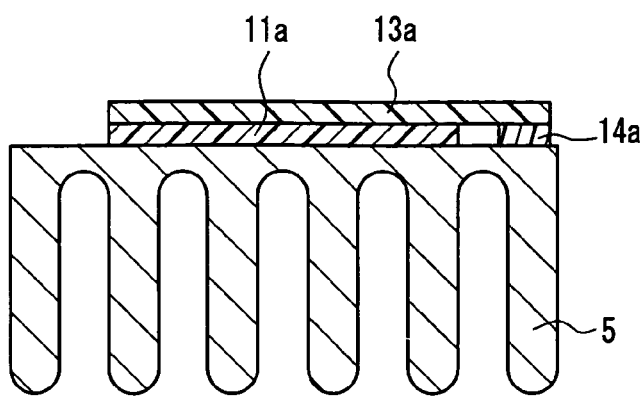
FIG. 3A is a cross-sectional view showing a putty sheet according to Example 4, which is bonded to a heat-dissipating member together with a film having a tab.
Figure 3B:
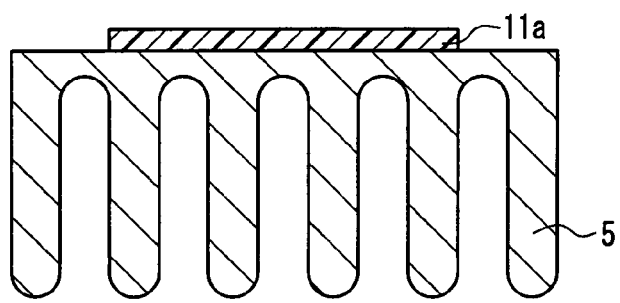
FIG. 3B is a cross-sectional view showing the putty sheet from which the film having a tab is peeled off to bond the putty sheet.
Figure 3C:
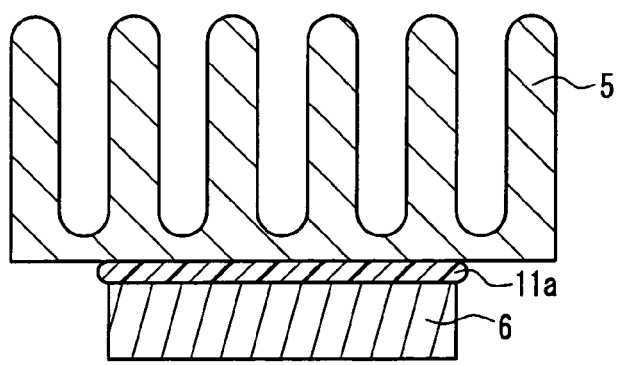
FIG. 3C is a cross-sectional view of the putty sheet bonded to the heat-dissipating member, which is attached further to a heat-generating element.

In use, each piece of the putty sheet is separated manually together with the polyethylene sheet 13a (the film having a tab) along the incision formed on the putty sheet 11a shown in FIGS. 2A and 2B in order to obtain a piece as shown in FIG. 2C. Next, one surface of the putty sheet 11a is bonded to a heat-dissipating member 5 shown in FIG. 3A, from which the polyethylene sheet 13a is peeled off (FIG. 3B). Subsequently, the other surface of the putty sheet 11a is pressed onto a heat-generating element 6 such as a semiconductor, and attached thereto in the state as shown in FIG. 3C. This putty sheet 11a, having a good repairability, kept its putty state for a long time.

Example 5

100 mass parts of silicone gel (SH1886, A:B=80:20 by mass parts) was prepared. To this silicone gel 800 mass parts of aluminum oxide particles as a thermal conductive filler (AS30 manufactured by SHOWA DENKO) and 4 mass parts of black iron oxide were added, and the silicone gel was kneaded to provide a thermal conductive composition. This composition was sandwiched between release sheets having fluorine resin layers and pressed at a temperature of 100° C. for 30 minutes, thereby forming a sheet having a thickness of 0.5 mm. The sheet was provided with a tab 10 mm in width, cut apart to provide a piece as a sample. This heat-dissipating putty sheet, having a good repairability, kept its putty state for a long time. The evaluation result will be shown in tables below.

Example 6

100 mass parts of silicone gel (SH1886, A:B=60:40 by mass parts) was prepared. To this silicone gel 850 mass parts of aluminum oxide particles as a thermal conductive filler (AS30 manufactured by SHOWADENKO) and 250 mass parts of manganese zinc ferrite (manufactured by TODA-KOGYO CORP.) having a particle diameter of 5 μm were added, and the silicone gel was kneaded to provide a thermal conductive composition. This composition was sandwiched between release sheets having fluorine resin layers and pressed at a temperature of 100° C. for 30 minutes, thereby forming a sheet having a thickness of 0.5 mm. The sheet was provided with a tab 10 mm in width, and cut apart to provide a sample. This heat-dissipating putty sheet, having a good repairability, kept its putty state for a long time. The evaluation result will be shown in tables below.

μm were added to 100 mass parts of methyl phenyl silicone oil having a viscosity of 100 mPa·s and a specific gravity of 0.95. Then, the silicone oil was kneaded to provide a thermal conductive composition. This composition was sandwiched between release sheets having fluorine resin layers and pressed at a room temperature, thereby forming a sheet having a thickness of 0.5 mm. The sheet was provided with a tab 10 mm in width, and cut apart to provide a sample. This heat-dissipating putty sheet, having a good repairability, kept its putty state for a long time.

As mentioned above, a thin sheet was bonded to a thin polyethylene sheet and provided with a tab, thereby providing a heat-dissipating putty sheet that can be transferred and bonded to a desired position.

Evaluation results for the Examples and Comparative Examples are shown in Tables 1 and 2 below.

TABLE 1

| Nos. | Example 1 | Example 2 | Com. Ex. 1*1 | Com. Ex. 2 | Com. Ex. 3 |
|---|---|---|---|---|---|
| Heat-dissipating sheet state | Putty | Putty | Cured | Cured | Putty |
| Thermal conductivity (W/m · K) | 3 | 3.5 | 3 | 3.5 | 3 |
| Dielectric constant (100 Hz) | 5.2 | 0.8 | 5.2 | 8 | 5.2 |
| Thermal resistance (° C./Watt) | 0.4 | 0.37 | 0.8 | 0.7 | 0.35 |
| Compression force when compressed by 50% in thickness direction (kgf/cm$^2$) | 5.4 | 5.9 | 45 | 60.5 | 8.8 |
| Operability | A*2 | A | A | A | A |

*1Com. Ex. denotes "Comparative Example".
*2A sheet that can be treated directly by hand is marked 'A' for operability.

TABLE 2

| Nos. | Example 4 | Example 5 | Example 6 | Example 7 | Example 8 |
|---|---|---|---|---|---|
| Heat-dissipating sheet state | Putty | Putty | Putty | Putty | Putty |
| Thermal conductivity (W/m · K) | 3.2 | 3 | 3.2 | 3 | 3.2 |
| Dielectric constant (100 Hz) | 8 | 5.2 | 8 | 5.2 | 8 |
| Thermal resistance (° C./Watt) | 0.35 | 0.35 | 0.36 | 0.35 | 0.36 |
| Compression force when compressed by 50% in thickness direction (kgf/cm$^2$) | 7.4 | 8.7 | 7.5 | 8.1 | 6.9 |
| Operability | A | A | A | A | A |

Example 7

800 mass parts of aluminum oxide particles as a thermal conductive filler (AS30 manufactured by SHOWADENKO) and 4 mass parts of black iron oxide were added to 100 mass parts of dimethyl silicone oil having a viscosity of 100 mPa·s and a specific gravity of 0.96. Then, the silicone oil was kneaded to provide a thermal conductive composition. This composition was sandwiched between release sheets having fluorine resin layers and pressed at a room temperature, thereby forming a sheet having a thickness of 0.5 mm. This sheet was provided with a tab 10 mm in width, and cut apart to provide a sample. This heat-dissipating putty sheet, having a good repairability, kept its putty state for a long time. The evaluation result will be shown in tables below.

Example 8

850 mass parts of aluminum oxide particles as a thermal conductive filler (AS30 manufactured by SHOWADENKO) and 250 mass parts of manganese zinc ferrite (manufactured by TODAKOGYO CORP.) having a particle diameter of 5

As shown in Tables 1 and 2, a heat-dissipating putty sheet according to any of Examples has a high thermal conductivity, and a low dielectric constant and a compression force when compressed by 50% in the thickness direction, and an improved operability.

The heat-dissipating putty sheet of the present invention can be applied to heat-generating parts of various electronic devices such as video game machine, personal computers, various electronic equipment, various semiconductors, and power modules.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

The invention claimed is:

1. A heat-dissipating putty sheet formed by applying a thermally conductive composition onto a release sheet, wherein the thermally conductive composition comprises a thermally conductive filler of not less than 600 mass parts blended to 100 mass parts of a liquid silicone having a viscosity in a range of 20 to 2000 mPa·s, and the thermally conductive composition is prevented from crosslinking further and curing at a temperature of 25° C. so as to keep a putty state, and the thermally conductive composition has a thermal conductivity of not less than 3 W/m·K; and the heat-dissipating putty sheet has a thickness ranging from 0.5 mm to 3 mm, wherein the release sheet is treated to have an embossed surface.

2. The heat-dissipating putty sheet according to claim 1, wherein the putty sheet is applied onto a release sheet so that it may be transferred from the release sheet to a subject.

3. The heat-dissipating putty sheet according to claim 1, wherein the putty sbeet can be released manually without any considerable deformation.

4. The heat-dissipating putty sheet according to claim 1, wherein the liquid silicone comprises at least one selected from the group consisting of a liquid silicon gel and a silicone oil.

5. The heat-dissipating putty sheet according to claim 1, wherein the thermally conductive filler comprises at least one filler selected from the group consisting of a metal oxide, a metal nitride, and a metal carbide.

6. The heat-dissipating putty sheet according to claim 5, wherein the thermally conductive filler comprises at least one filler selected from the group consisting of aluminum oxide, zinc oxide, magnesium oxide, manganese zinc ferrite, boron nitride, titanium nitride, aluminum nitride, silicon carbide, and iron carbide.

7. The heat-dissipating putty sheet according to claim 1, wherein the putty sheet has a thermal resistance of not more than 0.6° C./Watt.

8. The heat-dissipating putty sheet according to claim 1, wherein a compression force when compressing the putty sheet by 50% in the thickness direction is not more than 10 kgf/cm$^2$.

9. The heat-dissipating putty sheet according to claim 1, wherein the heat-dissipating putty sheet is disposed on a film having a tab, and a tape for indicating a pickup position is bonded to an end of the film.

10. The heat-dissipating putty sheet according to claim 1, wherein the liquid silicone comprises a solution A containing a vinyl group-containing polysiloxane and a curing catalyst and a solution B containing a crosslinking agent and a vinyl group-containing polysiloxane at a mass part ratio in a range of from A:B=95:5 to 55:45.

* * * * *